United States Patent

[11] 3,625,522

[72] Inventor Edward Thomas Humby
Ilford, England
[21] Appl. No. 875,612
[22] Filed Nov. 12, 1969
[45] Patented Dec. 7, 1971
[73] Assignee The Plessey Company Limited
Ilford, England
[32] Priority Nov. 12, 1968
[33] Great Britain
[31] 53,594/68

[54] PICKUP ARM ACTUATING MECHANISM FOR AUTOMATIC RECORD CHANGERS
7 Claims, 2 Drawing Figs.

[52] U.S. Cl. .................................................. 274/10 R
[51] Int. Cl. .................................................. G11d 15/00, G11d 17/00
[50] Field of Search .................................................. 274/10 R

[56] References Cited
UNITED STATES PATENTS

| | | | |
|---|---|---|---|
| 3,030,115 | 4/1962 | Hardy et al. .................. | 274/10 R |
| 3,243,188 | 3/1966 | Caddy et al. .................. | 274/10 R |

*Primary Examiner*—Harry N. Haroian
*Attorney*—Blum, Moscovitz, Friedman & Kaplan

ABSTRACT: A selector cam varies according to its setting position, the distance of the pivot of a stop lever having a stop face at end, from a pickup-positioning pin on a pickup plate pivotally movable with the pickup spindle for any given position of the pickup arm. The stop lever is lost-motion coupled to a drive lever transmitting the movement of a cam-follower to the pickup arm control lever so as to move the stop lever clear of the path of the positioning pin during the outward movement of the pickup arm and producing, before the stop face of the stop lever is withdrawn from this path to permit playing of a record, a wiping movement of this face, this face being cam-shaped to first ensure engagement of the pickup-positioning pin with the record groove and then gradually release any resilient forces built up during this initial period. Friction drive for the pickup plate during the positioning movement is effected by a return arm which is friction-pivoted to the pickup arm control plate and which, at the beginning of the inward movement, clasps a pin of the pickup plate in pincer fashion.

PICKUP ARM ACTUATING MECHANISM FOR AUTOMATIC RECORD CHANGERS

This invention relates to automatic record changers and has for an object to provide an improved actuating mechanism for the pickup arm which permits the arm to be automatically deposited selectively in any one of a number of radial positions relative to the gramophone turntable with the use of only a single pair of cooperating abutment surfaces both of which are operative in all the selective positions.

Another object is to provide an improved actuating mechanism for the pickup arm in which movement a stop face employed for arresting movement of the pickup arm by the mechanism towards the turntable center prior to the deposition of the pickup arm can be utilized for counteracting the risk of so-called skating of the pickup arm when the pickup arm is freed from restraint to begin the playing of a record.

Figure 1:
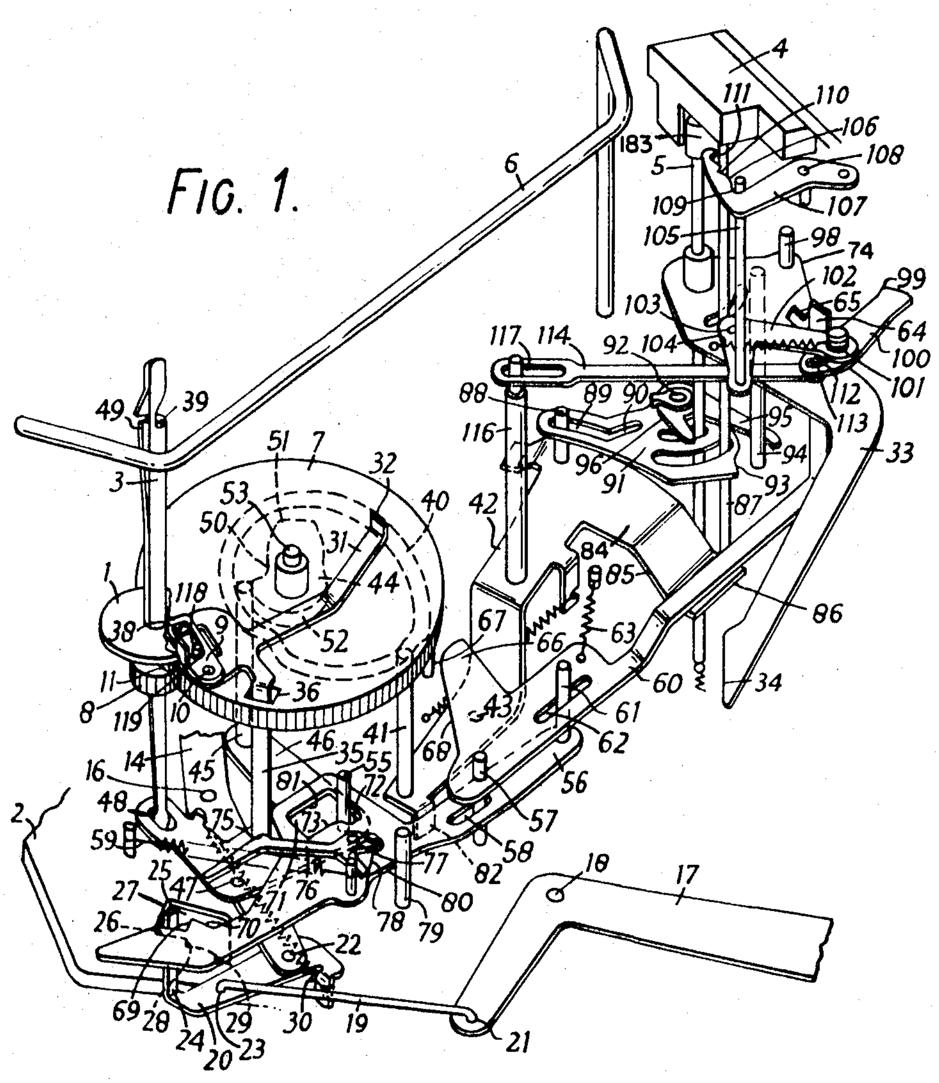
Figure 2:
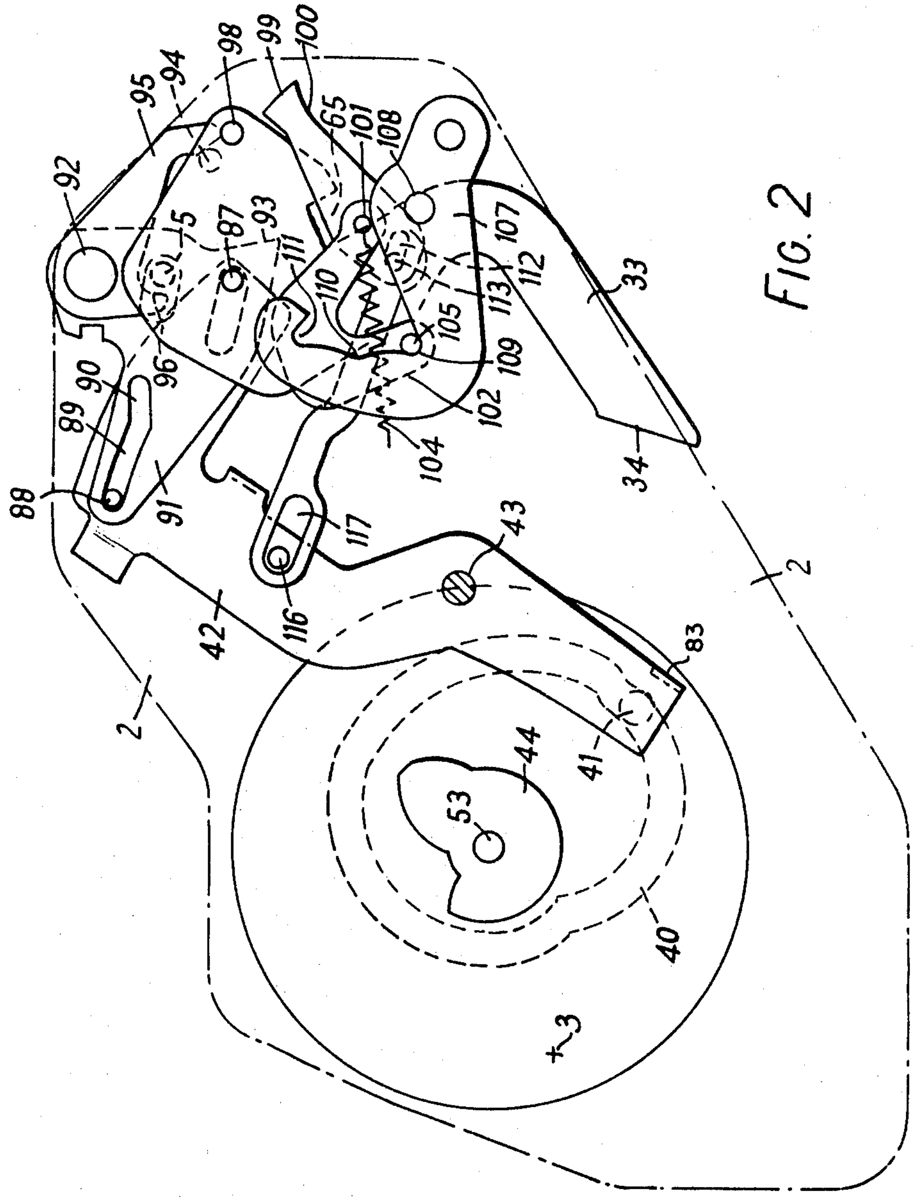

According to a feature of the invention a single stop pawl is arranged to be resiliently held in engagement with a selected portion of a position-selector cam face and is arranged to be angularly displaced so as to be clear of the path of an abutment movable with the pickup arm when the mechanical friction drive for the pickup arm has become disengaged at the beginning of the play of a record. Other features will become apparent from the following description of an embodiment with reference to the accompanying drawings. In these drawings:

FIG. 1, which is identical with FIG. 1 of our copending patent application Ser. No. 875,611, by E.W.J. Caddy, assigned to the assignees of the present invention, is somewhat schematic perspective view of the operative parts of a record-changer mechanism incorporating both the present invention and the invention of the said copending application, and FIG. 2 is a top plan view of a similar mechanism, in which most of the elements not directly concerned with the operation of the present invention have been omitted for clarity. All parts forming the mechanism described in the said copending application have been indicated by the same reference numbers as in that application.

Referring now to the drawings, the illustrated record changer is supported by a mounting plate 2 in which a record turntable, schematically indicated at 1, for supporting the records to be played is rotatably mounted. The turntable has a central aperture through which a stationary record spindle 3 extends, which at a distance above the turntable 1 is formed in a well-known manner with a recess forming a shoulder 39, and which is slotted to accommodate a record-ejector pawl 49, which is also, at the beginning of each record-changing cycle, utilized for sensing the presence or absence of a record on the shoulder 39. A so-called stabilizer arm 6 is also provided, which serves to reset on a stack of records placed on the shoulder 39 to ensure their substantially horizontal position. A pickup arm 4, pivoted about a transverse horizontal axis, is carried by a pickup support 183 which is fixed at the upper end of a vertical pivot spindle 5. The turntable 1 is driven in a conventional manner by a motor, not shown, via a friction wheel, not shown, which engages an upstanding collar, not shown, near the circumference of the turntable 1. The turntable is equipped with a coaxial pinion 8, which is fixed to it for common rotation, and with a catch tooth 11. The record-changing mechanism is actuated by a cam wheel 7 which is toothed for driving cooperation with the pinion 8, except for a gap which serves to arrest the cam wheel 7 at a predetermined position at the end of each revolution unless and until a trip pawl 9, pivoted to the cam wheel 7 by a pin 10, is moved into the path of the catch tooth 11 to transmit the drive from the catch tooth to the cam wheel for an amount of movement sufficient to ensure engagement of the teeth of the cam wheel 7 with the pinion 8. The pickup spindle 5 carries, at a distance below the pickup arm, a so-called pickup plate 33, and this pickup plate has an arm terminating in an abutment surface 34, which, at the end of the play of a record, initiates a revolution of the cam wheel 7 by engaging a lug 32 on a friction arm 31. This arm forms part of a trip mechanism carried on the cam wheel 7 and additionally including the trip pawl 9, which is friction-coupled with the arm 31 for common movement about the pin 10.

The cam wheel 7 has two cam tracks. One unidirectional acting circumferential track is formed on a cam disc 44 and is utilized to control movement of the record-ejector pawl 49, acting positively for the direction of movement of the record-ejection movement towards the shoulder 39 and allowing resilient return movement of the pawl 49 away from that shoulder 39 into engagement with the hole of the next-following record or, when no record is left in the stack, to sense the absence of a record. The other track 40 is formed on a groove, which is engaged by a follower pin 41 projecting from the surface of a cranked drive lever 42, which is pivoted to the mounting plate at 43. This other track 40 thus positively controls pivotal movement of the cranked lever 42 in both directions, and this cranked lever 42 is utilized to actuate the pickup-arm positioning movement with which the present invention is concerned.

At the beginning of a record-changing cycle, that is to say when the pinion 8 faces the gap in the teeth of cam wheel 7, the cranked drive lever 42 is in the illustrated position, in which the follower pin 41 has a maximum distance from the journal axis 53 of the cam wheel 7. During the change cycle the cam wheel 7 rotates in an anticlockwise direction, as seen from the top and as illustrated in FIG. 2, and the shape of the cam groove 40 is such as to produce, during a first part of this rotation, clockwise movement of the drive lever 42. This drive lever has, at its end opposite to that carrying the pin 41, a laterally extending arm 84, which near its end is deflected to form a ramp 85 which descends towards the outer end of the arm and which is followed in turn by a short horizontal end portion 86. A pickup-arm lifting spindle 87 which, in a conventional way, extends vertically and will when raised engage the underside of the pickup arm 4 to lift the pickup from the record by pivotal movement of the arm 4 about a horizontal pin extending through bracket 183, is supported on the arm 84. In the so-called rest position illustrated in FIG. 1, the lifting spindle rests on the flat end piece 86 of the arm 84, so that during an early part of the clockwise movement of the lever 42 the spindle 87 will ride up the ramp 85 to lift the pickup from the record or from the pickup rest and then, during further clockwise movement of the drive lever 42 beyond this position, the lifting spindle 87 will be supported on the horizontal upper portion of the drive-lever extension arm 84, that is to say on that portion which extends between the lever 42 proper and the ramp 85. The lifting spindle 87 then will not allow the pickup arm 4 to return to its normal position and be cleared by the spindle 87 until the drive lever 42 has substantially fully returned to its illustrated rest position, that is to say until the cam wheel 7 has nearly completed its revolution, and it will be readily appreciated that any horizontal movement of the pickup arm other than movement following the record groove must be limited to the intervening period in which the pickup arm is raised above the level of any records lying on the turntable. These horizontal arm movements are likewise derived from the drive lever 42. For this purpose the drive lever is equipped with a drive pin 88, and this pin engages an angular slot 89, 90 of a pickup-control lever 91, which is mounted for pivotal movement about a vertical pin 92 fixed relative to the mounting plate 2. The radially outer part 89 of the slot 89, 90 is arranged to form a circular arc coaxial with the pivot 43 of the drive lever 42 when the pickup control lever 91 is in its illustrated position of rest, while the radially inner portion 90 of the slot extends at an angle to this outer portion 89 and is so arranged as to be reached by the drive pin 88 after the pickup-lift spindle has reached the horizontal portion of the arm 84 above the ramp 85. Continued clockwise movement of the drive lever 42 will then produce anticlockwise movement of the pickup-control lever 91, and this lever 91 has an edge or face portion 93 which, depending on the position in which the pickup arm was last left, will sooner or later strike a pickup-arm control pin 94 extending downwardly from the pickup plate 33 and will thereafter, with the help of the plate 33, positively move the pickup arm 4 about its spindle 5 to a predetermined position, in which the pickup arm is clear of any record moving down from the shoulder 39 on to the turntable, and in which the pickup arm is ready to be deposited on the usual pickup rest.

A second lever 95, hereinafter called return lever, is also pivotally movable about the pin 92 and is friction-coupled with the pickup-control lever 91 so that the return lever tends to move with the latter during the just-described anticlockwise movement. However, as a rule its anticlockwise movement with the pickup-control lever 91 will normally be arrested by abutment of an extension 96 of the return lever 95 against the pickup-pivot spindle 5, and the return lever 95 will then remain stationary until the anticlockwise movement of the pickup-control lever 91 and of the pickup plate 33 with the pickup arm 4 is completed. The return lever 95 will then be substantially in contact with the pickup-arm control pin 94, so that the pin 94 is clasped between the return lever 95 and the edge 93 of the pickup-control plate 91. When now the direction of movement of the drive lever 42, and thus also that of the pickup-control lever 91, is reversed, the pickup arm 4 and plate 33 will participate in the return movement of the control lever 91, due to the frictional coupling of the pickup arm with the control lever 91 via the return lever 95 and control pin 94. This inward movement of the pickup arm serves to place the pickup arm over the starting groove of the record and is, when the appropriate position of the pickup arm has been reached, arrested by a mechanical stop in a manner described further below. While further clockwise movement of the pickup plate 33 and the pickup return lever 95 is then prevented, the friction coupling between the return lever 95 and the pickup-control lever 91 allows, nevertheless, movement of the latter, under the action of pin 88 in slot portion 90, to continue until the pickup-control lever 91 reaches its illustrated position of rest, in which the drive pin 88 is free to move along the part-circular slot portion 89 of the control lever 91 without producing further movement of the lever 91.

The geometry of the movement of the pickup control lever 91 in relation to the pickup plate 33 is such that the distance of the control pin 94 from the pivot of the control lever 91 decreases during outward or anticlockwise movement of the pickup plate 33, and conversely increases during inward or clockwise movement, and the edges 93 and 95 between which the pin 94 travels, are inclined to each other so that the gap between them decreases as the radial distance of the pin 94 from the pivot 92 increases. In this way, it is ensured that during inward movement of the pickup plate (and with it the pickup arm) the pin 94 is firmly controlled in both directions, and any small amount of play which may exist in the rest position is taken up when the inward movement of the arm commences. This ensures steady and smooth movement of the pickup arm to the positioning stop provided by the single-stop selector mechanism which will now to be described.

In order to arrest the inward movement of the pickup arm produced by the movement of the control lever 91, the pickup plate 33 is, in addition to its downwardly projecting control pin 94, provided with an upwardly projecting positioning pin 98, which is arranged for cooperation with a stop face 99 of a stop pawl 100. The latter is carried, through a pivot 101, at one end of a bellcrank type selection transfer lever 102 pivoted about a fixed axis 103, and this transfer lever 102 is biased in a clockwise direction, by a tension spring 104, thus urging an upstanding pin 105 of the selection transfer level 102 against a cam surface 106 of a position selector lever 107, which is movable by manual or other means about a fixed pivot 108. The cam surface 106 is provided with indexing recesses 109, 110 and 111 at progressively increasing radial distances from the pivotal 108 of the lever 107, and when the selector lever 107 is moved about its pivot 108, the pin 105 of selector cam lever 102, will, according to the position of the selector lever 107, be urged by the spring 104 into engagement with one or other of the indexing recesses 109, 110 and 111, thus causing a cam lever 102 to assume the appropriate one of three possible positions. The stop lever 100 extends from the stop face 99 beyond its pivot 101 where it is formed with a slot 112 which is engaged by an end pin 113 of a coupling link 114. The other end of the link 114 has an aperture 117 which is elongated in the longitudinal direction of the link, and when is engaged by a coupling pin 116 which projects upwardly from the surface of the drive lever 41. The direction of slot 112 in the stop lever 100 is such that, when the coupling pin 116 has taken up its lost motion in the slot 117 of the coupling link 114, the pin 113 will first move to the far end of the slot 112 and then engage lever 100 to move it in an anticlockwise direction from its illustrated position of rest into a position in which its end faces pickup-positioning pin 98, with the distance between the pin 98 and the stop face 99 determined by the radial distance from the pivot 103, of the indexing recess, 109, 110 or 111 operative in the selected indexing position of selector cam lever 102. To ensure that when the pickup-control lever 91, and with it the pickup arm, begins its clockwise (inward) movement, the stop pawl 100 remains in its position facing the positioning pin 98 for a period sufficiently long to ensure engagement of the pin 98 with the stop face 99 whichever position of the selector cam has been chosen, the length of the slot 117 in the link 114 is made sufficient to allow free movement of the pin 116 of drive lever 42 during the anticlockwise movement of the latter until the drive pin 88 passes from the inclined portion 90 to the coaxial portion 89 of the cam slot in pickup control plate 91, while the slot 112 in stop pawl 100 permits thereafter some initial movement of the coupling link 114 without affecting the position of the stop pawl 100. When, however, the length of the slot 112 has been taken up, the further anticlockwise movement of drive pawl 42 will move the stop lever 100 in a clockwise direction, thus causing its point of contact with the pickup-positioning pin 98 to travel along its stop face from the leading to the trailing end of this face in the direction of the present movement of the pawl 100, and the stop pawl will be in the illustrated position clear of the path of pin 98 when the pinion 8 reaches the gap in the teeth of the cam wheel 7.

In the meantime the pickup-control lever 91 has also moved back to its original position, this return movement being delayed by the length of the coaxial slot 89 until the return lever after 95, having been held back by the pickup-control pin 94 when the pickup plate 33 was retained by the stop face 99, by the movement of the stop pawl to clear the pickup-control pin 94. It will be readily appreciated that when the cam wheel 7 reaches its rest position, the pickup plate 33 is free to move to the innermost position provided on the player without causing engagement of the control pin 94 with the associated face 93 of the pickup-control lever 91, thus ensuring complete freedom of pickup arm movement during the play of the record.

As was pointed out further above, the ramp surface 85 of the arm 84 of drive lever 42 allows the pickup arm to descend for depositing the pickup on the record at the selected point shortly before the revolution of the cam wheel 7 is completed. According to a subsidiary feature of the present invention invention the time of this deposition is so coordinated with the actuation of the stop lever 100 that the deposition commences substantially at the same time at which the anticlockwise movement of the stop pawl 100 commences, and is completed at a time when the point of contact of the face 99 with the positioning pin 98 has only swept along part of the face 99, so that, according to the number of records present on the turntable, the pickup will engage the topmost record on the turntable at some time during this initial part of the travel of the point of contact along the face 99. This initial part of the face is made substantially circular and coaxial with the pivot axis of stop pawl 100 or even slightly increasing in diameter so that until this point is reached, the pickup arm is substantially prevented from moving radially inwardly, or may even be caused to move slightly outwardly, relative to the record, while during at least part of the remaining portion nearing the trailing end of the face 99 the angle of the face is such, considering the rate of pivot movement of the pawl 100 under the action of the link 114, as to permit inward movement of the pickup at a rate slightly higher than that produced by travel of the pickup along a playing groove. In this manner the stop pawl 100, in addition to acting as a stop determining the pickup-arm depositing point, will while the positioning pin 98 is in contact with the initial part of the face 99, ensure engagement of the pickup stylus with a record groove by maintaining the pickup arm stationary or moving it slightly outward during a period which may be equivalent to one-half revolution of the turntable, and by then allowing inward movement of the pickup arm but limiting the rate of this movement to a maximum slightly in excess of the rate corresponding to the record-groove pitch will allow any resilient force built up due to this previous retention of the pickup arm, to be released gradually before the positioning pin 98 finally leaves the face 99. In view of this the stop pawl 100 may be said to combine the function of normal positioning stops such as the steps 17 on the pickup plate 9 of copending U.S. Pat. application Ser. No. 752,239 issued as U.S. Pat. No. 3,531,129 with that of the friction arm 20 and stabilizing lever 25 and of the arcuate slot 24 of the latter in the same copending application. During the clockwise movement of the drive lever 42 at the initial part of the change cycle, the slots 122 and 117 ensure that, during the outward movement of the pickup arm, the stop lever 100 keeps clear of the path of the pickup-positioning pin 98 until the pin 98 has moved beyond the area swept by the face 99 of the stop lever 100.

It will also be appreciated that when a lever 60, having a stop lug 64, is provided for arresting pickup arm movement at the end of play and becomes biased, during the automatic play of a record, towards the outer edge of the pickup plate 33 when the pickup arm is over the turntable, and the pickup plate is formed with a locking recess 65, as shown in FIG. 1, the engagement of the stop lug 64 with the locking recess 65 will, during the next following anticlockwise movement of drive lever 42, prevent the pickup arm from any inward movement so that, as the drive lever 42 moves back to its position of rest and the ramp 85 passes the lifting spindle 87, the latter will deposit the pickup arm on the pickup-arm rest prior to switching off the mechanism by the means described in the above-mentioned copending patent application Ser. No. 875,611.

What we claim is:

1. In actuating mechanism for the pickup arm of an automatic record-changer gramophone having a turntable, a pickup arm, a cycle-control mechanism including drive means for moving the pickup arm to a position away from the turntable center at the beginning of a record-changing cycle, and friction-drive means for subsequently moving the pickup arm towards the turntable center prior to its deposition to permit a record to be played, the combination comprising a control pin 98 movable with the pickup arm 4 as the latter moves towards and away from the turntable center, a stop pawl 100 having an end face 99 for cooperation with said pin to arrest such movement of the pickup arm towards the turntable center, a selection-transfer lever 102 pivotally movable about a fixed axis 103, the stop pawl 100 being pivotally attached to the selection-transfer lever 102 at a point 101 laterally displaced from said axis 103 relative to the radius connecting said end face 99 to said point 101, spring means 104 biasing said transfer lever 102 for movement of said point 101 in the direction in which said control pin 98 moves during pickup-arm movement towards the turntable axis, a selector member having a plurality of abutment surfaces 109, 110, 111 for selective cooperation with said transfer lever 102 to terminate the angular movement of the transfer lever, under the action of said spring means 104, about said fixed axis 103 at different angular positions of the transfer lever 102, and drive means producing pivotal to-and-fro movement of the stop pawl 100 about said point 101 of the selection-transfer lever 102 during each change cycle into place the end face 99 of the stop pawl 100 into the path of the control pin 98 after completion of the pickup-arm movement away from the turntable center, and to move the stop pawl 100 clear of said path at the time of deposition of the pickup arm to permit a record to be played.

2. Mechanism as claimed in claim 1, wherein the drive means for the pickup arm include a pickup control plate 91 having an edge 93 for cooperation with a portion 94 movable with the pickup arm 4 to produce outward movement of the pickup arm, and a return lever 95 friction-coupled to this control plate for engagement with such portion to establish a friction drive for movement of the pickup arm towards the turntable center.

3. Mechanism as claimed in claim 2, which includes a stop member 5 with which the return lever 95 is arranged to cooperate, during the operation of the control plate 91 for outward movement of the pickup arm, in such manner as to move the return lever 95 to an initial position in which said portion 94 movable with the pickup arm 4 is substantially captive between the control plate 93 and the return lever 95.

4. Mechanism as claimed in claim 1, wherein the pickup-arm drive means of the cycle-control mechanism include a drive lever 42 which carries out one to-and-fro pivotal movement during each change-cycle to produce both the raising and lowering of the pickup arm and the pickup-arm movement away from and towards the turntable center, and wherein the drive means for the stop pawl 100 include a lost motion connection 112, 114, 117 to said drive lever 42.

5. Mechanism as claimed in claim 1, wherein the drive means for the stop pawl 100 are so constructed as to retain the end face 99 of the stop pawl in contact with the said control pin 98 for a short time after the deposition of the pickup arm, and the end face 99 of the stop pawl 100 forms a cam of such shape as to allow, as a result of the pivotal movement of the stop pawl 100 during this time, the pickup arm 4 to move towards the turntable center at a controlled rate which exceeds the maximum rate of movement produced by engagement of the pickup with the playing groove of a commercially available disc record.

6. Mechanism as claimed in claim 5, wherein the drive means for the stop pawl 100 and the shape of its end face 99 are so arranged as to retain the pickup arm 4 stationary during that part of the pickup-arm deposition movement which permits the arm 4 to move from the level of stylus contact with the top record of the maximum assembly of records for which the device is intended down to the level of a single record resting on the turntable 1.

7. Mechanism as claimed in claim 5 wherein the cam shape of the end face 99 of the stop pawl 100 is such as to produce a small amount of outward movement of the pickup arm 4 before allowing the pickup-arm movement towards the turntable center at said controlled rate.

* * * * *